Patented Mar. 19, 1940

2,194,394

UNITED STATES PATENT OFFICE 2,194,394

AIR COOLING ARRANGEMENT FOR AUTOMOBILES

Miloš Klavík, Prague, Czechoslovakia

Application December 16, 1938, Serial No. 246,248
In Czechoslovakia December 18, 1937

2 Claims. (Cl. 180—54)

It has already been proposed in the case of automobiles with streamlined bodies and rear engines, to arrange a cooler for the oil in the front part of the vehicle in order to attain as complete a cooling of the engine as possible since with such bodies and arrangement of the rear engines, it is the cooling of the engine which forms the most difficult problem. It has also been proposed to make the bottom of the engine housing as an ample cooler for the oil and this mainly in the effort to obviate the comparatively long and susceptible pipe to the forward cooler.

The present invention relates to an improvement of this last-mentioned cooling arrangement and consists in arranging on the bottom of the body, the lower surface of which for aerodynamic reasons should be as straight as possible, one or more slots in front of the engine through which a corresponding portion of the air which is underneath the car and where usually there is a considerably excess pressure, is deflected to the rear part or edge of the body where during travelling there is a considerable vacuum, so that a very strong flow of the air through the conduit formed by the bottom of the body and the bottom of the engine is attained, this engine bottom being made as a cooler and its gills being located in the current of air.

Figure 1:
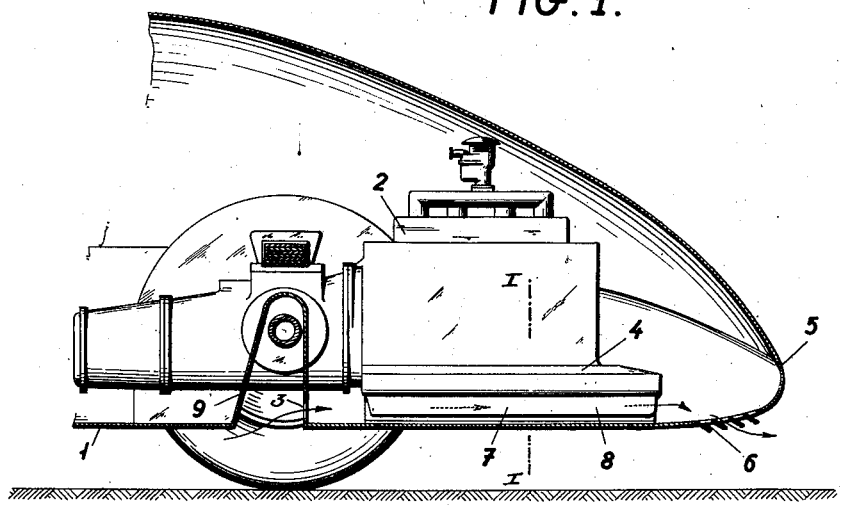
Figure 2:
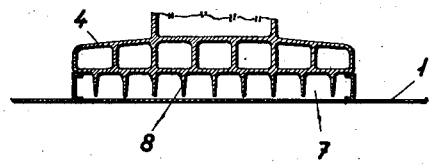

An example of carrying out the invention is shown in the annexed drawing, in which Figure 1 is a view in elevation with partial section of the rear part of the vehicle, and Figure 2 is a cross-section on the line I—I of Figure 1.

As shown by the drawing there is provided in the bottom of the body 1 and in front of the engine 2, a slot 3, so that the air penetrating through this slot into the interior of the body is conveyed between the bottom 1 of the body and the bottom 4 of the engine housing to the rear edge 5 of the body, where it escapes through correspondingly arranged openings 6 into the space behind the vehicle and in which during the running there is a great partial vacuum.

In the conduit 7 so produced, a strong natural flow of air takes place which cools the gills, 8, projecting from the lower surface of the engine base 4. If the rear axle is in front of the engine, then preferably the slot may be combined with the lateral cut-out parts 9 for the purpose of the passing through thereof of the rear oscillating part axles (out of the vehicle). In the same way, for the purpose described, instead of one lower slot, there may be provided a number of slots.

I claim:

1. An air cooling arrangement for an automobile with streamlined body and rear engine comprising a bottom forming the lower part of the body, an air conduit leading under the engine to the rear of the automobile, an inlet for air in the bottom communicating with the conduit and an outlet at the rear of the automobile for the air which passes through the conduit, an oil-cooler under the engine and gills on the oil-cooler projecting downwardly into the air conduit.

2. An air cooling arrangement for an automobile with streamlined body, rear engine and rear axles in front of the engine comprising a bottom forming the lower part of the body and raised to enclose the rear axles, an air conduit passing under the engine towards the rear, an inlet for admitting air to the conduit situated in the rear wall of the axle enclosure and an outlet at the rear of the automobile for discharging the air which passes through the conduit.

MILOŠ KLAVÍK.